Figure 1:
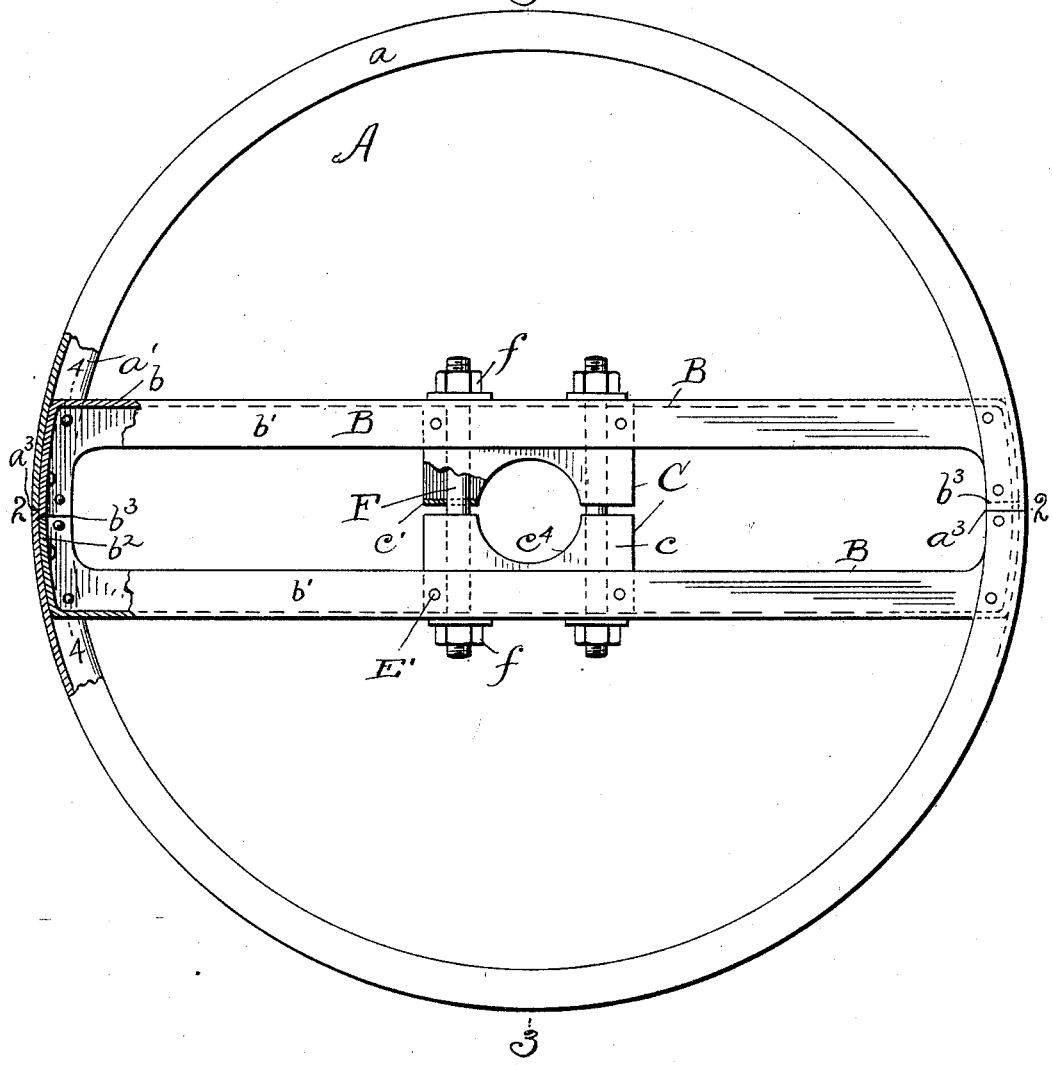

No. 756,391. PATENTED APR. 5, 1904.
A. L. MOORE & R. DEMING.
PULLEY.
APPLICATION FILED DEC. 26, 1901.
NO MODEL. 2 SHEETS—SHEET 1.

Witnesses
E. B. Gilchrist
H. M. Wise

Inventors,
Arthur L. Moore,
Robert Deming,
By Thurston & Bates
Attys

No. 756,391. PATENTED APR. 5, 1904.
A. L. MOORE & R. DEMING.
PULLEY.
APPLICATION FILED DEC. 26, 1901.
NO MODEL. 2 SHEETS—SHEET 2.
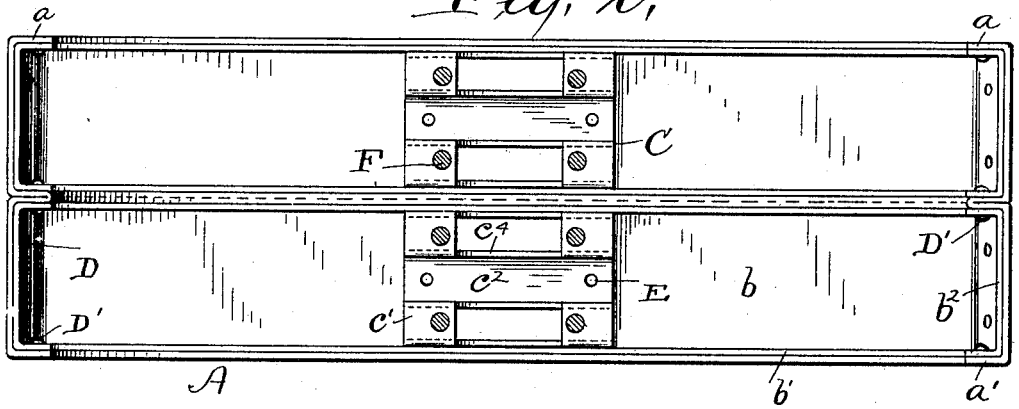
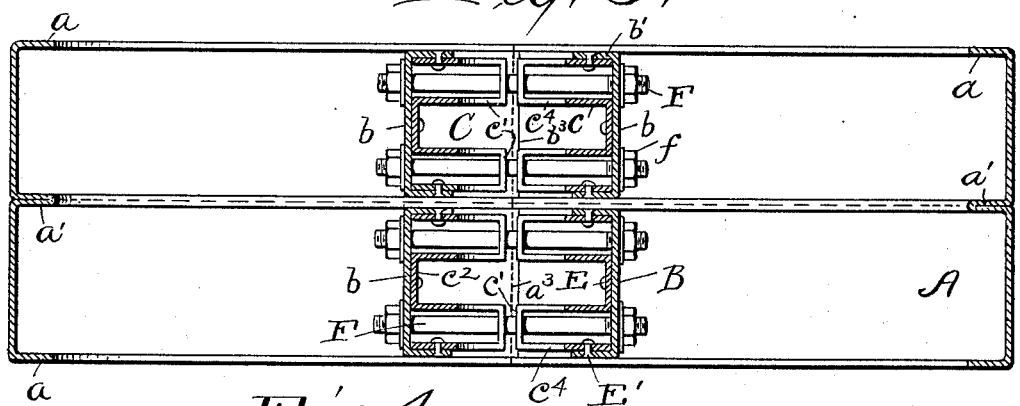
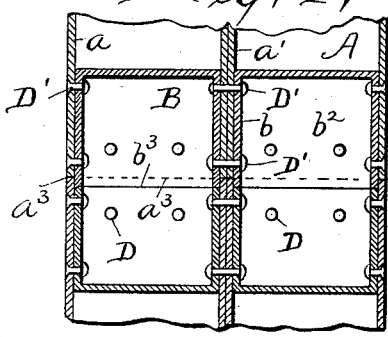
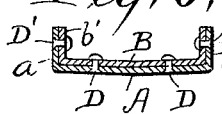
Witnesses
E. B. Gilchrist
H. M. Wise
Inventors,
Arthur L. Moore,
Robert Deming.
By Thurston & Bates
Attys.

No. 756,391.

Patented April 5, 1904.

UNITED STATES PATENT OFFICE.

ARTHUR L. MOORE AND ROBERT DEMING, OF CLEVELAND, OHIO, ASSIGNORS TO THE CLEVELAND PULLEY COMPANY, OF CLEVELAND, OHIO, A CORPORATION OF OHIO.

PULLEY.

SPECIFICATION forming part of Letters Patent No. 756,391, dated April 5, 1904.

Application filed December 26, 1901. Serial No. 87,189. (No model.)

*To all whom it may concern:*

Be it known that we, ARTHUR L. MOORE and ROBERT DEMING, citizens of the United States, residing at Cleveland, in the county of Cuyahoga and State of Ohio, have invented a certain new and useful Improvement in Pulleys, of which the following is a full, clear, and exact description, reference being had to the accompanying drawings.

One of the objects of this invention is to provide a sheet-metal all-steel pulley which shall combine the qualities of lightness and strength, be very cheap to construct, and durable in service.

Another object of the invention is to provide a pulley-rim which, while being cheaply constructed, shall be very strong and true.

To the above ends the invention comprises a pulley having a sheet-metal rim with flanges and channel-shaped metal-facing spoke-bars secured to the rim and having their side flanges abutting the flanges of the rim; also, the combination, with spoke-bars, of a rim having an intermediate integral inwardly-projecting flange formed by doubling the metal on itself.

The invention likewise includes the arrangement of the spoke-bar with the center-bearing.

All these features are hereinafter more fully described, and definitely set out in the claims.

In the drawings, Figure 1 is a side elevation of the pulley complete. Fig. 2 is a diametric plan of one half of the pulley on its separating-face, indicated by the line 2 2 of Fig. 1. Fig. 3 is a section of the pulley at right angles to Fig. 2, as indicated by the line 3 3 of Fig. 1. Fig. 4 is a cross-section of the pulley on the line 4 4 of Fig. 1 looking outward. Fig. 5 is a perspective view of one of the center-blocks. Fig. 6 is a cross-section through the rim and spoke-bar of a pulley of narrower face.

Referring to the drawings, the pulley is seen to be made in halves, held together by bolts F, having nuts $f$. Each half of the pulley, as shown, comprises the rim-section A, one or more spoke-bars B, secured to the same, and a center-block C for each spoke-bar.

The rim A is rolled in a semicircular form, and a depending flange $a$ is rolled onto each edge. With wide-faced pulleys, as illustrated in Figs. 1 to 4, there is also an intermediate flange $a'$, which projects inward around the rim and may be formed by doubling the metal on itself before it is rolled or by drawing it. When this intermediate flange $a'$ is employed, each half of the pulley may have a spoke-bar for each side of the intermediate flange, or, if preferred, a single spoke-bar may be the full width of the pulley. This latter arrangement is illustrated in Fig. 6, where the intermediate flange is omitted, which is the preferred form in pulleys of narrower face. In either construction there are always two edge flanges $a$ to the rim, which are engaged by the outer sides $b'$ of spoke-bars whether one or more of such bars be employed in each half.

The spoke-bar B is of channel form, having a base $b$, side flanges $b'$, and ends $b^2$, turned at a general angle to the base, though curved to fit the inner side of the rim. The side flanges $b'$ abut the inner face of the edge flanges of the rim, and these parts are secured together by suitable means, that shown being rivets D and D', which pass through the periphery of the rim and through the side flanges thereof into the corresponding parts of the spoke-bar. By having the channel-shaped spoke-bars face each other, as shown, the bases of the channels stand some distance back from the diameter. The channels thus form braces across the rim, stiffening it, while they themselves are better able to resist the stress caused by the rotating shaft.

The upturned end $b^2$ of the spoke-bar at one end extends a little beyond the end of the semicircular rim, while at the other end it falls a little short of the rim. This provides an interlocking feature for the two halves of the rim, the tongue thus formed by the projecting opposite ends of opposite halves meshing with the corresponding recesses presented by the other half. The meeting lines of the rim-section and of the spoke-bars are indicated by $a^3$ and $b^3$, respectively, in Figs. 1 and 4.

The center-block C is made of sheet metal bent back and forth in a series of U's, as shown most clearly in Fig. 5. There are thus presented a plurality of parallel plates $c$, connected alternately above and below by right-angle integral plates $c'$ $c^2$. These center-blocks are secured to the bases and sides of the spoke-bars in suitable manner, as by rivets E and E'. The center-blocks are perforated at $c^3$ for the passage of the bolts F, which lie between consecutive plates $c$, and they are semicircularly recessed transversely at $c^4$ to enable them to surround the shaft with or without an intermediate bushing and grasp it by the tightening of the bolts. This seating of the center-blocks within the channels of the spoke-bars make at once a very neat and rigid construction.

Now, as shown in Figs. 1 to 4, in each half of the pulley are two spoke-bars side by side, and the corresponding filling-block is duplicated, while a unitary rim is provided which has an integral inwardly-extending buckling-flange for strengthening it. This intermediate flange is preferably formed in the metal by suitable dies before the same is rolled. The same rivets D' may be used for securing both of the side-by-side spoke-bars to the interposed intermediate flange, as shown in Figs. 2 and 4. This provision of a wide rim with intermediate integral flange has considerable advantage over placing two separate pulleys side by side and riveting the meeting edge flanges of their rims together, for such riveting is liable to draw a little on one rim or the other and pull it out of true, and, moreover, the rivet-holes weaken the strength of the flange. In order to make the pulley absolutely true, the two parts of it are bolted together, and the recesses $c^4$ in the center-blocks, which form the shaft-hole, are thereafter bored out, making the face of the pulley absolutely concentric. The outer ends of the various rivets are countersunk to leave no projecting parts.

Having described our invention, we claim—

1. In a split pulley, the combination of a rim, spoke-bars composed of a pair of channel members arranged parallel with the split diameter of the pulley, the channels facing said diameter, and center-blocks carried by said members within their channels, substantially as described.

2. In a split pulley, the combination of a rim having inwardly-projecting peripheral flanges, a pair of channel-shaped metal spoke-bars contacting with said flanges and secured to them, said spoke-bars having their channels facing the split diameter of the pulley, whereby the bases of said channels are some distance back from said diameter and thereby form two braces across the rim, said channels having ends engaging the inner surface of said rim and secured to the rim, substantially as described.

3. In a sheet-metal split pulley, the combination of a metal rim having inwardly-projecting edge flanges, a pair of channel-shaped spoke-bars facing the split diameter of the pulley, the flanges of the spoke-bars being riveted to the flanges of the rim, and center-blocks riveted to the flanges of the spoke-bars, substantially as described.

4. In a sheet-metal split pulley, the combination of a rim having inwardly-projecting peripheral flanges, a pair of channel-shaped spoke-bars contacting with said flanges, said spoke-bars having their channels facing the split diameter of the pulley whereby the base of said channels is some distance back from said diameter, said channels having ends engaging the inner surface of said rim, and rivets securing the flanges of the spoke-bars to the flanges of the rim and the ends of the spoke-bars to the face of the rim, substantially as described.

5. In a sheet-metal split pulley, the combination of a metal rim, channel-shaped spoke-bars with the channels facing each other, and center-blocks carried by the spoke-bars and held in place by the channels thereof, said center-blocks being made of sheet metal bent into U shape in cross-section, substantially as described.

6. A sheet-metal split pulley composed of a separable rim, a pair of channel-shaped spoke-bars carried thereby, the channels facing each other, sheet-metal center-blocks occupying said channels and consisting of plates bent into a series of U's and secured to the side flanges of the channels and the base thereof, and clamping-bolts for holding the pulley together, which bolts pass through the center-blocks and lie between parallel plates thereof, substantially as described.

7. In a sheet-metal split pulley, the combination of a rim having inwardly-projecting peripheral flanges, a pair of channel-shaped spoke-bars contacting with said flanges and secured to them, said spoke-bars having their channels facing the split diameter of the pulley, and metal center-blocks formed in U shape occupying the channel of the spoke-bars and secured to them, substantially as described.

8. In a pulley, the combination of a rim having inwardly-projecting edge flanges and an internal intermediate flange formed by a doubled-in portion of the metal of the face of the rim, spoke-bars secured to the edge flanges and the intermediate flange, and center-blocks carried by the spoke-bars, substantially as described.

In testimony whereof we hereunto affix our signatures in the presence of two witnesses.

ARTHUR L. MOORE.
ROBERT DEMING.

Witnesses:
ALBERT H. BATES,
H. M. WISE.